United States Patent
Sano et al.

(10) Patent No.: US 8,080,120 B2
(45) Date of Patent: Dec. 20, 2011

(54) METHOD AND APPARATUS OF MANUFACTURING ANNULAR CONCENTRIC STRANDED BEAD CORD

(75) Inventors: Yuichi Sano, Utsunomiya (JP); Hitoshi Wakahara, Utsunomiya (JP); Kenichi Okamoto, Itami (JP)

(73) Assignees: Sumitomo (SEI) Steel Wire Corp., Hyogo (JP); Sumitomo Electric Tochigi Co., Ltd., Tochigi (JP)

( * ) Notice: Subject to any disclaimer, the term of this patent is extended or adjusted under 35 U.S.C. 154(b) by 769 days.

(21) Appl. No.: 12/001,284

(22) Filed: Dec. 11, 2007

(65) Prior Publication Data

US 2008/0135156 A1    Jun. 12, 2008

(30) Foreign Application Priority Data

Dec. 11, 2006   (JP) .................................. 2006-332954
Apr. 25, 2007   (JP) .................................. 2007-116046

(51) Int. Cl.
*B29D 30/48* (2006.01)

(52) U.S. Cl. .............. 156/136; 57/21; 156/422; 245/1.5

(58) Field of Classification Search .................. 156/136, 156/422; 245/1.5; 140/88; 57/21; 242/434.5, 242/434.6

See application file for complete search history.

(56) References Cited

U.S. PATENT DOCUMENTS

| | | | |
|---|---|---|---|
| 3,748,841 A * | 7/1973 | Fraleigh et al. .................... | 57/21 |
| 4,276,104 A * | 6/1981 | Riggs ............................ | 156/123 |
| 2005/0145320 A1 | 7/2005 | Niwa | |
| 2008/0087369 A1 * | 4/2008 | Sasabe et al. .................. | 156/136 |

FOREIGN PATENT DOCUMENTS

| | | |
|---|---|---|
| JP | 3499261 | 3/1995 |
| JP | 2001-47169 | 2/2001 |
| JP | 3101960 | 3/2004 |
| JP | 2004-98640 | 4/2004 |
| JP | 3657599 | 3/2005 |
| JP | 2005-342746 | 12/2005 |
| JP | 2006-110981 | 4/2006 |
| WO | WO-2004/018187 | 3/2004 |

OTHER PUBLICATIONS

Patent Abstracts of Japan for Japanese Publication No. 07-068662, Publication date Mar. 14, 1995 (1 page).
Patent Abstracts of Japan for Japanese Publication No. 2005-342746, Publication date Dec. 15, 2005 (1 page).

(Continued)

*Primary Examiner* — Geoffrey L Knable
(74) *Attorney, Agent, or Firm* — Osha Liang LLP

(57) ABSTRACT

A method of manufacturing an annular concentric stranded bead cord, wherein, while rotating an annular core at a fixed position in a peripheral direction, a reel, upon which a lateral wire is wound, repeatedly performs a pendulum swinging movement and a perpendicular movement with respect to the annular core, thereby spirally winding the lateral wire upon the annular core to form a sheath layer. When forming the sheath layer, a fulcrum of the pendulum swinging movement of the reel is determined so that, with reference to a tangential line of a circle of the annular core passing through a winding point where the lateral wire is wound upon the annular core, the lateral wire is wound upon the winding point of the annular core within 15 degrees at a position above the tangential line and within a range of 55 degrees at a position below the tangential line.

7 Claims, 11 Drawing Sheets

OTHER PUBLICATIONS

Patent Abstracts of Japan for Japanese Publication No. 2006-110981, Publication date Apr. 27, 2006 (1 page).
Patent Abstracts of Japan for Japanese Publication No. 2004-098640, Publication date Apr. 2, 2004 (1 page).
Patent Abstracts of Japan for Japanese Publication No. 2001-047169, Publication date Feb. 20, 2001 (1 page).
Notification of Reasons for Rejection for Japanese Application No. 2007-116046, mailed on Aug. 29, 2007 (11 pages).

* cited by examiner

FIG. 7
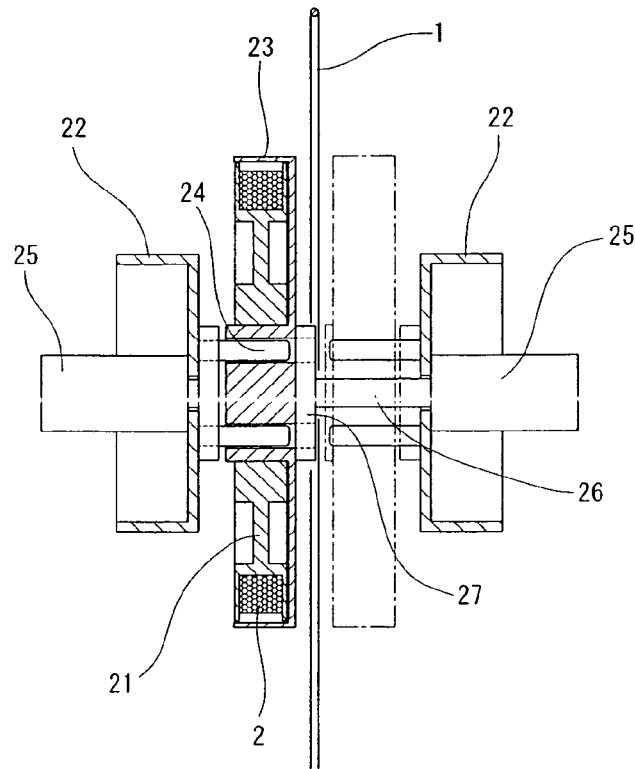
FIG. 8A
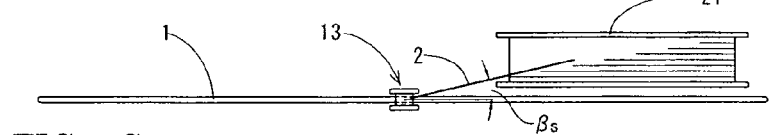
FIG. 8B
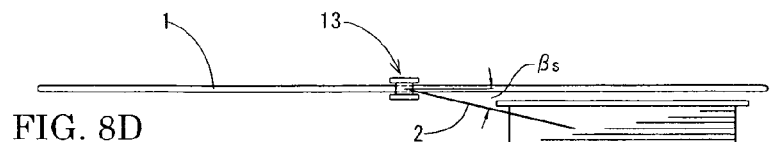
FIG. 8C
FIG. 8D Prior art

US 8,080,120 B2

METHOD AND APPARATUS OF MANUFACTURING ANNULAR CONCENTRIC STRANDED BEAD CORD

BACKGROUND OF THE INVENTION

1. Field of the Invention

The present invention relates to a bead cord which is embedded in a bead portion of a pneumatic tire. More particularly, the present invention relates to a method and an apparatus of manufacturing an annular concentric stranded bead cord having one sheath layer or a plurality of sheath layers formed by continuingly spirally winding a lateral wire along an annular core.

2. Description of the Related Art

An annular concentric stranded bead cord is used in tires of various types of vehicles.

As shown in FIGS. 9A and 9B, an annular concentric stranded bead cord includes a sheath layer of lateral wire 2 provided upon an annular core 1. It is manufactured by continuingly spirally winding the lateral wire 2 along the annular core 1 as a result of passing the lateral wire 2 to the inner side of a ring of the annular core 1 from the outer side of the annular core 1, and, then, passing them again to the inner side of the ring from the outer side of the ring.

The following methods have hitherto been disclosed as methods of manufacturing an annular concentric stranded bead cord.

First, Japanese Patent No. 3499261 discloses a method of manufacturing a bead cord using, as a lateral wire, a wire previously reformed so as to have at least twice the diameter of an annular core, when the lateral wire is spirally wound upon the annular core. When a bead cord manufactured by this method is used in a tire, a person has a feeling that elasticity is high, and a gripping force, turning force, and responsiveness are increased.

Japanese Unexamined Patent Application Publication No. 2001-47169 discloses another method. As illustrated in FIG. 10, in the method, an end of a lateral wire 2 is temporarily secured to an annular core 1 by a chucking mechanism. While rotating the annular core 1 in a peripheral direction, a reel 3 is revolved to an inner side and an outer side of the annular core 1. By this, the lateral wire 2 is spirally wound upon the outer periphery of the annular core 1. The chucking mechanism is unchucked from the annular core 1 before the end of the lateral wire 2 that is temporarily secured to the annular core 1 overlaps the position of revolution of the reel 3. Accordingly, interference between the chucking mechanism and the reel 3 is prevented from occurring to continue the revolution of the reel 3. This method makes it possible to alternately perform an S winding and a Z winding a plurality of times, so that problems, such as tangling and twisting of the lateral wire 2, are prevented from occurring. As a result, it is possible to considerably increase the productivity and the quality of the bead cord.

Japanese Unexamined Patent Application Publication No. 2004-98640 discloses still another method of manufacturing a bead cord. In the method, an end of a lateral wire is either entangled upon an annular core without securing the lateral wire or temporarily secured to the annular core, and allowed to rotate freely. A plane movement of a reel (for winding as a result of bending to a diameter that is less than that of the annular core), a vertical operation of the annular core, and rotation of the annular core are combined to entangle the lateral wire upon the annular core by bending stress of a steel wire, so that twisting stress is prevented from being generated for manufacturing the bead cord.

WO2004/018187A1 discloses still another method of manufacturing a bead cord. In the method, as illustrated in FIG. 12, a reel 3, upon which a lateral wire 2 is wound, is secured to a predetermined location. A driving unit 5, which rotates an annular core 1 in a peripheral direction, is made to reciprocate in a straight line along the surface of the annular core 1. At an end of a reciprocation period, the reel 3 is positioned at an outer side of a ring of the annular core 1 (as indicated by a solid line in FIG. 12). At the other end of the reciprocation period, the reel 3 is positioned in an inner side of the ring of the annular core 1 (as indicated by broken lines in FIG. 12). At the inner and outer sides of the ring of the annular core 1, the reel 3 is transferred so as to traverse the surface of the annular core 1, whereby the lateral wire 2, which is drawn out from the reel 3, is continuingly spirally wound upon the annular core 1, to manufacture the bead cord.

Japanese Unexamined Patent Application Publication No. 2006-110981 discloses still another method of manufacturing a bead cord. As illustrated in FIGS. 13 and 14, in the method, a reel 3 is made to, at a predetermined position, reciprocate so as to traverse a surface of an annular core 1. With a clamp unit 4, which corresponds to a winding point of a lateral wire 2, being a fulcrum, the annular core 1 is made to undergo a pendulum swinging movement. By this, the distance from the reel 3 to the winding point of the lateral wire 2 is maintained at a substantially constant value, so that, during winding, the lateral wire 2, which is drawn out from the reel 3, is not loosened. As a result, the lateral wire 2 is wound upon the annular core 1 at a constant tension to manufacture the bead cord.

The stability of the form of a bead cord is the most important for the quality of the bead cord. The bead cords manufactured by the methods according to the aforementioned patent documents have the following problems.

As regards the bead cord manufactured by the method disclosed in Japanese Patent No. 3499261, a lateral wire, which is previously formed so as to have a diameter that is at least twice that of the annular core for the purpose of increasing the elasticity of a tire, is wound. Therefore, it is difficult to achieve automation, and there are many factors that increase costs. In addition, when the coil diameter of the lateral wire, which is wound upon the annular core, is large, it is troublesome to wind the lateral wire by hand. Further, since the lateral wire is previously modified, resistance is increased when the lateral wire is drawn out, thereby causing winding problems. Still further, when the lateral wire is wound upon the annular core after taking up the lateral wire by the reel, the winding of the lateral wire becomes loose unless a certain tension that is greater than or equal to a certain value is constantly applied. Even with a small tension, the annular core tends to become deformed, thereby adversely affecting windability.

As regards the method disclosed in Japanese Unexamined Patent Application Publication No. 2001-47169, an end of the lateral wire is temporarily secured to the annular core by the chucking mechanism, and the reel is revolved to the inner side and the outer side of the annular core while the annular core rotates in the peripheral direction. Therefore, the angle at which the lateral wire is wound upon the annular core varies greatly. In addition, there are many unnecessary movements, and the apparatus, itself, becomes massive.

In addition, as regards the method disclosed in Japanese Unexamined Patent Application Publication No. 2001-47169, as shown conceptually in FIG. 10, the reel 3 revolves to the inner side and the outer side of the annular core 1. Therefore, the lateral wire 2 is wound upon the annular core 1 while a winding deviation angle $\beta_S$ changes from 0 degrees (shown in FIG. 11A), at which the lateral wire 2 and the annular core 1 are parallel to each other, to approximately 50 degrees (shown in FIG. 11B), at which the reel 3 is situated away from the annular core 1. A twist angle β of a bead core used in a generally commercially available tire is from 3.5 to 5.5 degrees in a 1+m twist structure for a two-wheeled vehicle. A twist angle β is approximately 7 degrees in a 1+m+n twist structure for a passenger vehicle/light truck. Therefore, as the difference between the winding deviation angle $β_S$ and the twist angle β becomes large as mentioned above, the state of arrangement of the lateral wire 2 that is being continuingly wound tends to become disturbed, thereby resulting in poor cord formability.

Further, as regards the method disclosed in Japanese Unexamined Patent Application Publication No. 2001-47169 in which the reel 3 revolves to the inner side and the outer side of the annular core 1, since the reel 3 moves along a circular path, its movement is redundant, thereby requiring a long period of time until the winding ends. In addition, since the lateral wire 2 is wound as a result of applying a certain tension, the annular core 1 is pulled in the peripheral direction. Therefore, the annular core 1 tends to meander, resulting in poor windability.

Next, as regards the method disclosed in Japanese Unexamined Patent Application Publication No. 2004-98640, the annular core is placed horizontally, and moves in a complicated manner. Therefore, similarly to the case disclosed in Japanese Unexamined Patent Application Publication No. 2001-47169, the winding deviation angle $β_S$ varies considerably, thereby resulting in unstable windability. In addition, the horizontal movement of the reel is reversed after one interval, and takes twice the time. As a result, twice the time is required to finish manufacturing the bead cord. Unless the movement of the annular core, which becomes the base during the winding, is maximally limited, the windability tends to become unstable. In particular, since the annular core is placed in a gravitational direction and is moved vertically with respect to the gravitational direction, and the reel, upon which the lateral wire is wound, is continuously moved, the windability is poor. As regards the method disclosed in WO2004/018187A1 illustrated in FIG. 12, the reel 3 is secured to a predetermined position, and the driving unit 5, itself, reciprocates in a straight line. By this, the annular core 1 moves close to and away from the reel 3 so that the reel 3 moves to the inner side and the outer side of the ring of the annular core 1. Therefore, when the annular core 1 approaches the reel 3, the lateral wire 2 is pushed in a direction in which the lateral wire 2 is loosened. In contrast, when the annular core 1 moves away from the reel 3, the lateral wire 2 is pulled. Therefore, the winding point where the lateral wire 2 is wound with respect to the annular core 1 is displaced greatly as the annular core 1 moves. Consequently, it is difficult to arrange the lateral wire 2, as a result of which the arrangement of the lateral wire 2 tends to be disturbed.

As regards the method disclosed in Japanese Unexamined Patent Application Publication No. 2006-110981 illustrated in FIGS. 13 and 14, the annular core 1, which rotates in the peripheral direction, undergoes pendulum swinging movement with the clamp unit 4 (which is the winding point of the lateral wire 2) serving as a fulcrum. Therefore, the entire apparatus becomes large, the rotation of the annular core 1 in the peripheral direction becomes unstable, and the arrangement of the lateral wire tends to become disturbed.

SUMMARY OF THE INVENTION

Accordingly, it is an object of the present invention to provide a method and apparatus of manufacturing an annular concentric stranded bead cord, which make it possible to perform winding at a high speed and to provide good winding performance, and which make it possible to achieve good formability of the cord without a disturbance in the arrangement state of a lateral wire as a result of stabilizing the rotation of an annular core in a peripheral direction.

To this end, according to a first aspect of the present invention, there is provided a method of manufacturing an annular concentric stranded bead cord. In the method, winding movements are repeated as a result of, while rotating an annular core in a peripheral direction, traversing and reciprocating a reel, upon which a lateral wire is wound, with respect to a surface of the annular core to inner and outer sides of a ring of the annular core, to traverse the reel so that a winding deviation angle $β_S$ of the lateral wire with respect to the surface of the annular core does not exceed 29 degrees. By this, the lateral wire, drawn out from the reel, is continuingly wound upon the annular core to form one or a plurality of sheath layers. An in-plane movement of the reel with respect to the surface of the annular core is pendulum swinging movement. The lateral wire, drawn out from the reel, is continuingly spirally wound upon the annular core by repeatedly traversing the reel with respect to the surface of the annular core to the inner and outer sides of the ring of the annular core as a result of moving the reel to a position where the reel traverses the inner side of the ring of the annular core at one end of a pendulum period and to a position where the reel traverses the outer side of the ring of the annular core at the other end of the pendulum period. A position of a fulcrum of the pendulum swinging movement of the reel is set so that an angle between the lateral wire, drawn out from the reel, and a tangential line of a circle of the annular core passing through a winding point where the lateral wire is wound with respect to the annular core is in a range within 15 degrees at a side opposite to the annular core with respect to the tangential line, and is in a range within 55 degrees at the side of the annular core with respect to the tangential line.

The "winding point" refers to a point of contact of the lateral wire and the annular core when the lateral wire is wound upon the periphery of the annular core.

In this invention, first, the reel traverses and reciprocates with respect to the annular core surface so that the winding deviation angle $β_S$ with respect to the annular core surface does not exceed 29 degrees.

This makes it possible for the reel to repeatedly traverse the annular core surface, with the movement of the reel away from the annular core surface being reduced to a minimum. Accordingly, it is possible to continuously spirally wind the lateral wire while the winding deviation angle $β_S$ between the lateral wire, which is drawn out from the reel, and the annular core is maintained.

Next, when the annular core is rotated at a fixed position in the peripheral direction, and the reel undergoes pendulum swinging movement with respect to the annular core, the following occurs. That is, depending upon the position of the fulcrum of the pendulum swinging movement of the reel, as viewed in the direction of the lateral wire with reference to a tangent line passing through the winding point of the annular core, the direction of the lateral wire, which is drawn out from the reel and reaches the winding point of the annular core, varies between one end of the pendulum period (at which the reel is at the position where it traverses the inner side of the ring of the annular core) and the other end of the pendulum period (at which the reel is at the position where the reel traverses the outer side of the ring of the annular core). When the angle between the direction of the lateral wire and the tangential line of the circle of the annular core at the winding point is large, the state of arrangement of the lateral wire becomes poor.

Since the lateral wire is wound upon the reel in the same direction as it is wound upon the annular core so that the minimum coil diameter becomes on the order of 55% of the diameter of the annular core, the influence on the arrangement state differs when the lateral wire is wound from the outer side of the winding point of the annular core from when the lateral wire is wound from the inner side of the winding point of the annular core. The influence on the arrangement state is greater when the lateral wire is wound from the outer side. With reference to the tangential line of the circle of the annular core passing through the winding point where the lateral wire is wound with respect to the annular core, the angle that does not adversely affect the arrangement state of the lateral wire is in a range within 15 degrees at a side opposite to the annular core, and is in a range within 55 degrees at the side of the annular core. The position of the fulcrum of the pendulum swinging movement of the reel needs to be determined so that the lateral wire is wound at the winding point of the annular core at these angle ranges.

In this invention, since the annular core is rotated at its fixed position in the peripheral direction, the annular core rotates in a stable state, so that the winding of the lateral wire is not easily disturbed.

In addition, by causing the reel to undergo pendulum swinging movement, the entire apparatus can be made considerably smaller than when the annular core is caused to undergo pendulum swinging movement.

It is preferable that the lateral wire, drawn out from the reel, be spirally wound upon the annular core as a result of temporarily securing a winding start end of the lateral wire using an unvulcanized rubber sheet. Since unvulcanized rubber is of the same quality as tire rubber, it does not need to be removed in a post-processing step.

To prevent the lateral wire from expanding, and to effectively distribute the rigidity of the lateral wire when spirally winding the lateral wire upon the annular core, it is preferable that the coil diameter of the lateral wire prior to taking up the lateral wire by the reel be previously adjusted so as to satisfy either one of the following expressions:

$$0.90D_R \leq D_{SO} \leq 3.3D_R, \text{ or}$$

$$0.55D_C \leq D_{SO} \leq 2.0D_C,$$

where $D_R$ is an outside diameter of the reel, $D_{SO}$ is the adjusted coil diameter of the lateral wire, and $D_C$ is a center diameter of the annular core.

In addition, to allow slight loosening of the lateral wire when spirally winding the lateral wire and to prevent expansion of the lateral wire, it is desirable that the reel be rotatably accommodated in a cassette having a cylindrical outer peripheral wall being in correspondence with the internal width of the reel and having a diameter that is slightly greater than the outside diameter of the reel. In addition, it is desirable that the lateral wire be drawn out from a draw-out hole provided in the outer peripheral wall of the cassette.

When a direction of curvature of the lateral wire, drawn out from the reel, is along a direction of curvature of the annular core at the winding point, the lateral wire is wound so that the curved form of the lateral wire is in accordance with the direction of curvature of the annular core. Therefore, a disturbance in the winding of the lateral wire does not easily occur. When the direction of curvature of the lateral wire is opposite to the direction of curvature of the annular core, the wound lateral wire repels in the direction of the curvature of the annular core, thereby causing the shape of the annular core to deviate from circularity and to become distorted. Therefore, the winding tends to become disturbed.

According to a second aspect of the present invention, there is provided a manufacturing apparatus which makes it possible to perform the method of manufacturing a concentric stranded bead cord. The manufacturing apparatus includes a driving unit, a reel, a pendulum mechanism, and facing reel transfer mechanisms. The driving unit rotates an annular core in a peripheral direction. The reel supplies a lateral wire to a winding portion of the annular core. The pendulum mechanism causes the reel to undergo a pendulum swinging movement along a surface of the annular core so that the reel is moved to a position where the reel traverses an inner side of a ring of the annular core at one end of a pendulum period of the reel and to a position where the reel traverses an outer side of the ring of the annular core at the other end of the pendulum period. The facing reel transfer mechanisms are provided on respective sides of the surface of the annular core so as to be positioned at a distance not preventing the rotation of the annular core in the peripheral direction. The lateral wire, drawn out from the reel, is continuingly spirally wound upon the annular core by repeatedly traversing the reel with respect to the surface of the annular core to the inner and outer sides of the ring of the annular core. A position of a fulcrum of the pendulum swinging movement of the reel is set so that an angle between the lateral wire, drawn out from the reel, and a tangential line of a circle of the annular core passing through a winding point where the lateral wire is wound with respect to the annular core is in a range within 15 degrees at a side opposite to the annular core with respect to the tangential line, and is in a range within 55 degrees at the side of the annular core with respect to the tangential line.

Here, the angle between the lateral wire, which is drawn out from the reel, and a horizontal line, passing through the winding point where the lateral wire is wound with respect to the annular core, refers to an angle between a straight line, connecting the winding point and a point at which a reel winding surface of the wire separates from the reel when the lateral wire is drawn out, and the horizontal line passing through the winding point of the lateral wire (refer to $\alpha_1$ and $\alpha_2$ in FIG. 1).

The driving unit includes two pinch rollers. The two pinch rollers rotate the annular core in the peripheral direction in a stable state without any slipping. A clamp unit is provided at a lateral-wire supply side, and performs positioning of the winding point while preventing lateral deflection as a result of holding the entire periphery at the winding point of the lateral wire and the annular core.

Accordingly, according to the invention, it is possible to provide a method of manufacturing an annular concentric stranded bead cord, which makes it possible to perform winding at a high speed and to provide good winding performance because a reel is made to undergo a pendulum swinging movement, and which make it possible to achieve good formability of the cord without a disturbance in the arrangement state of a lateral wire as a result of stabilizing the rotation of an annular core in a peripheral direction.

BRIEF DESCRIPTION OF THE DRAWINGS

FIG. 7 is a partial vertical plan view of the apparatus shown in FIG. 1, showing reel transfer mechanisms.

FIGS. 8A to 8D are conceptual plan views of states of movement of the reel when manufacturing the annular concentric stranded bead cord according to the present invention.

DESCRIPTION OF THE PREFERRED EMBODIMENTS

Figure 1:
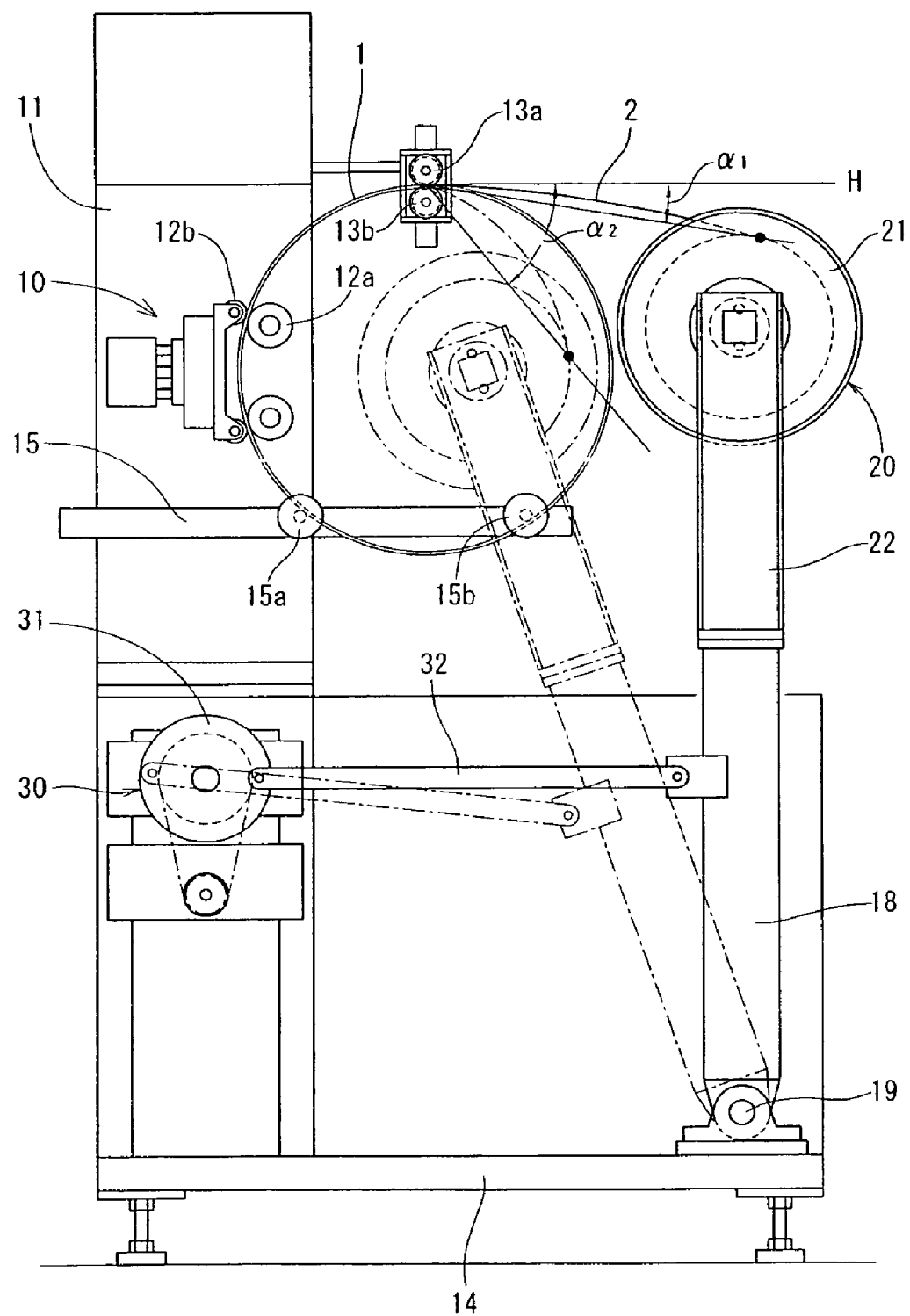
FIG. 1 is a front view of an apparatus of manufacturing an annular concentric stranded bead cord according to an embodiment of the present invention, wherein a state in which a reel is positioned at an outer side of a ring of an annular core at one end of a period of pendulum swinging movement of the reel is represented by a solid line, and a state in which the reel is positioned at an inner side of the ring of the annular core at the other end of the period of pendulum swinging movement of the reel is represented by broken lines.
Figure 2:
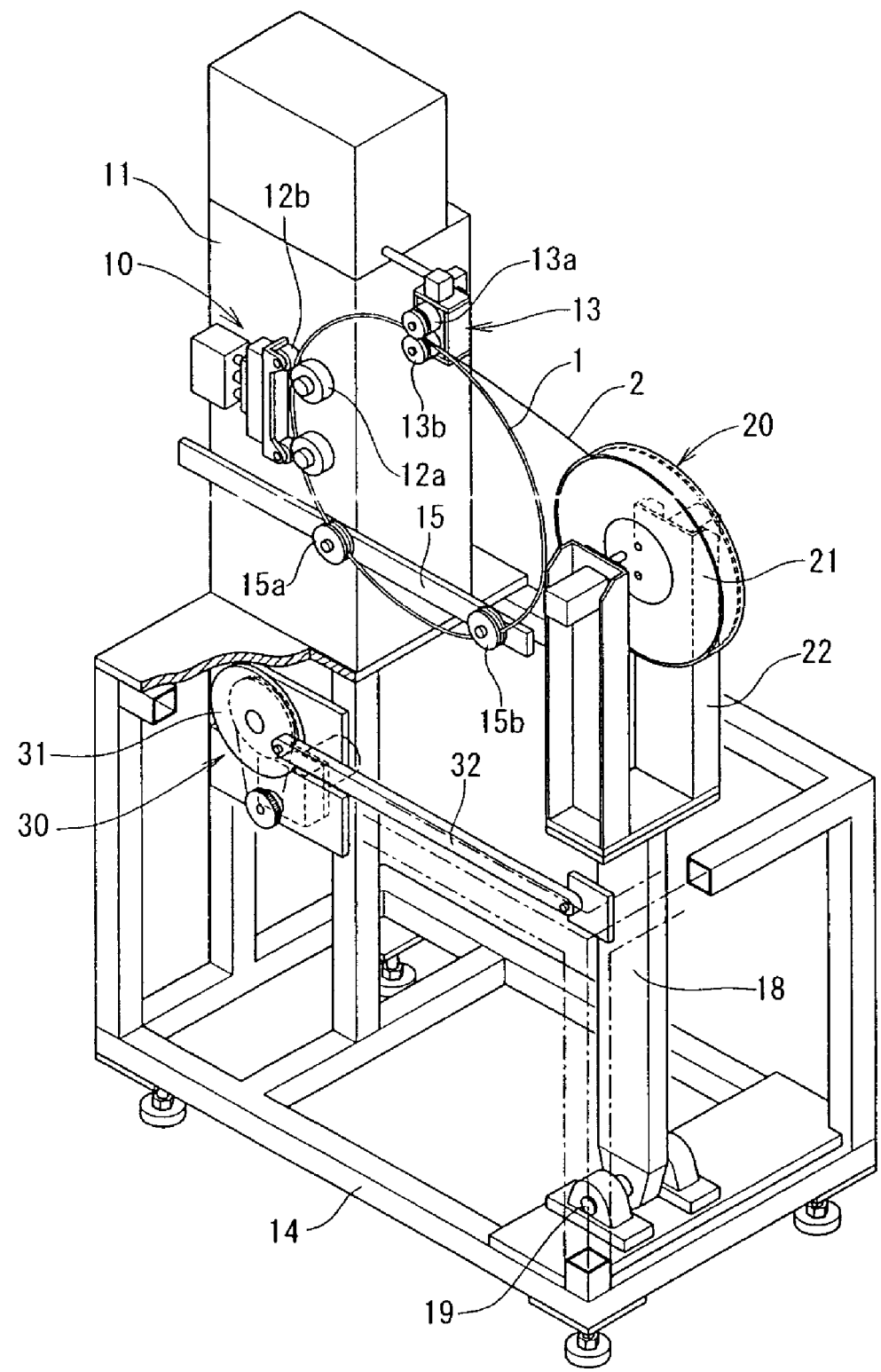
FIG. 2 is a perspective view of FIG. 1.
Figure 3:
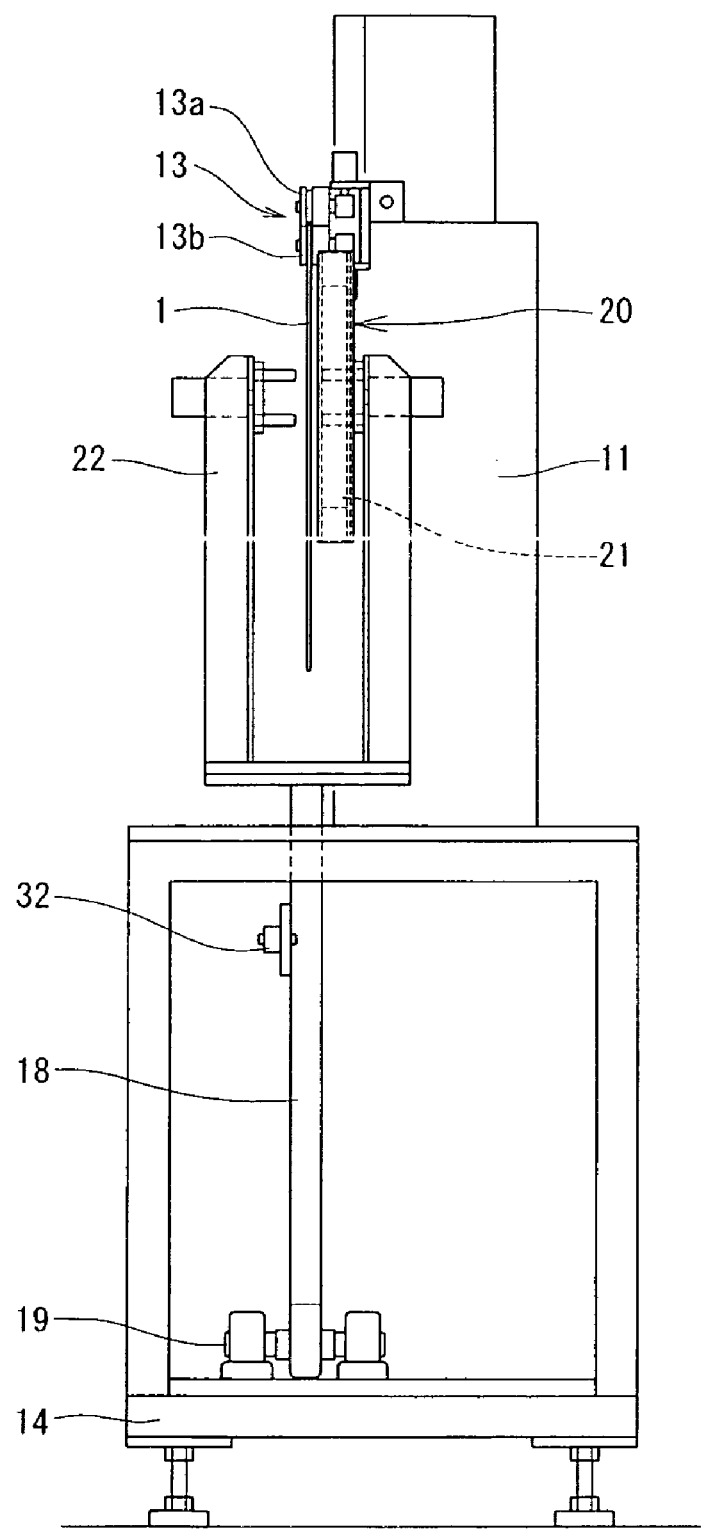
FIG. 3 is a right side view of FIG. 1.
Figure 4:
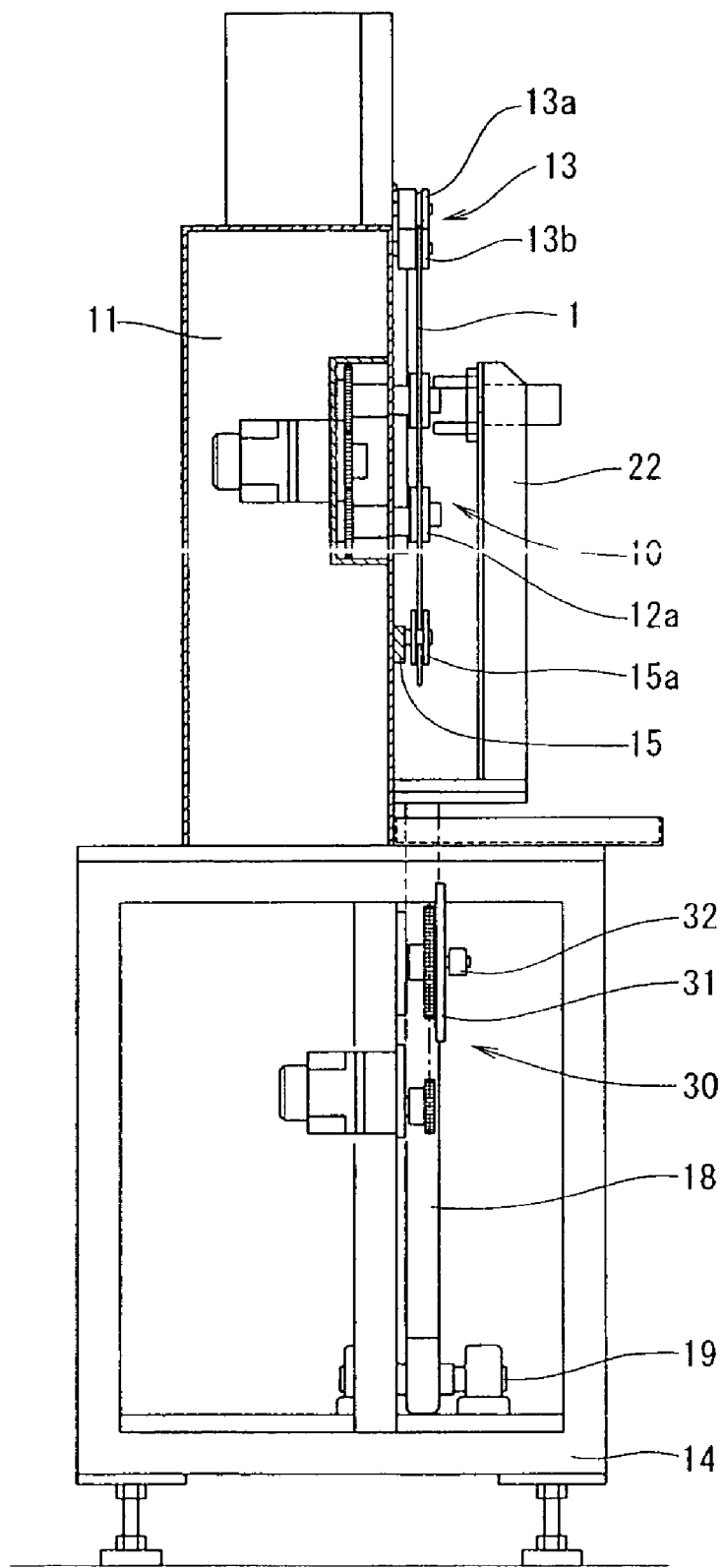
FIG. 4 is a left side view of FIG. 1.
Figure 5:
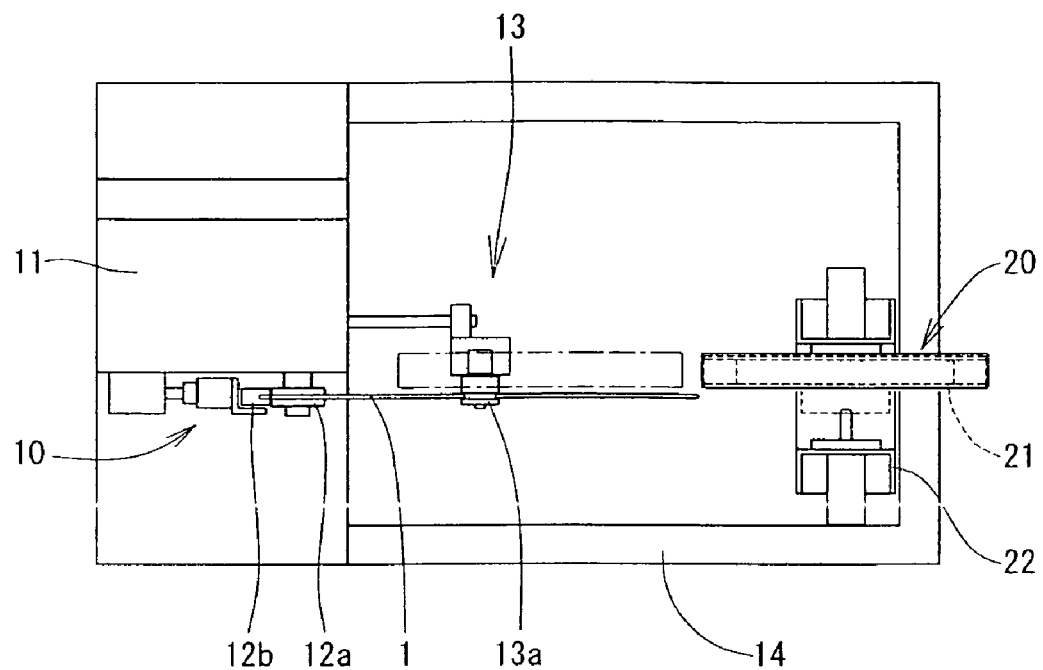
FIG. 5 is a plan view of FIG. 1.
Figure 6A:
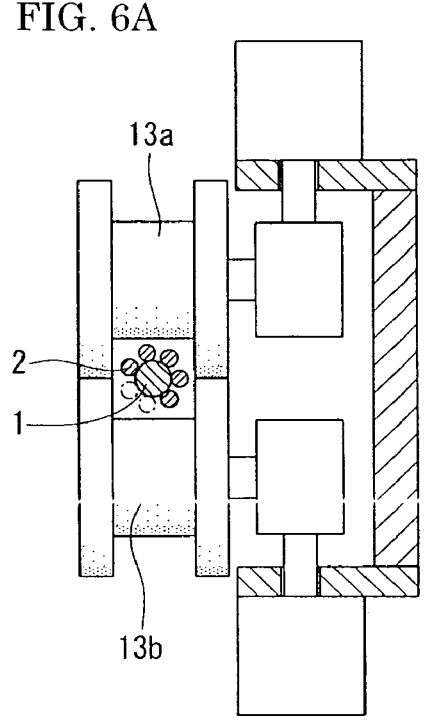
FIGS. 6A to 6C show exemplary clamp units provided at a driving unit.
Figure 6B:
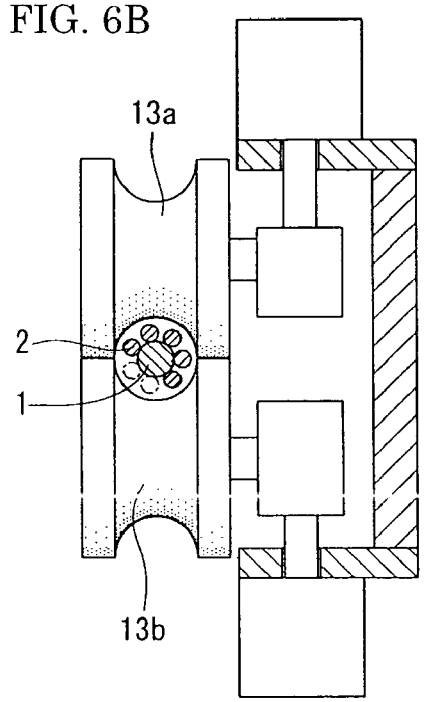
Figure 6C:
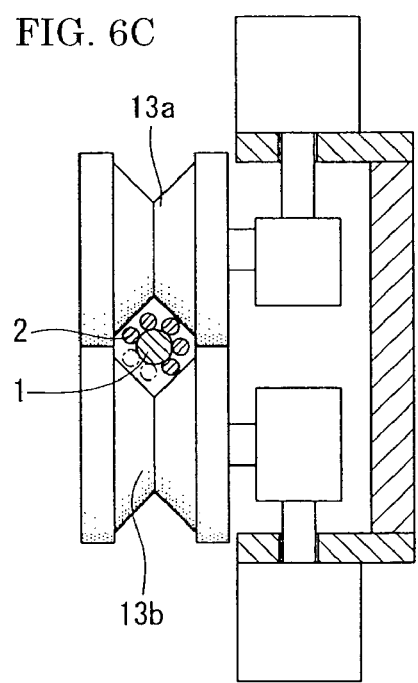
Figure 9A:
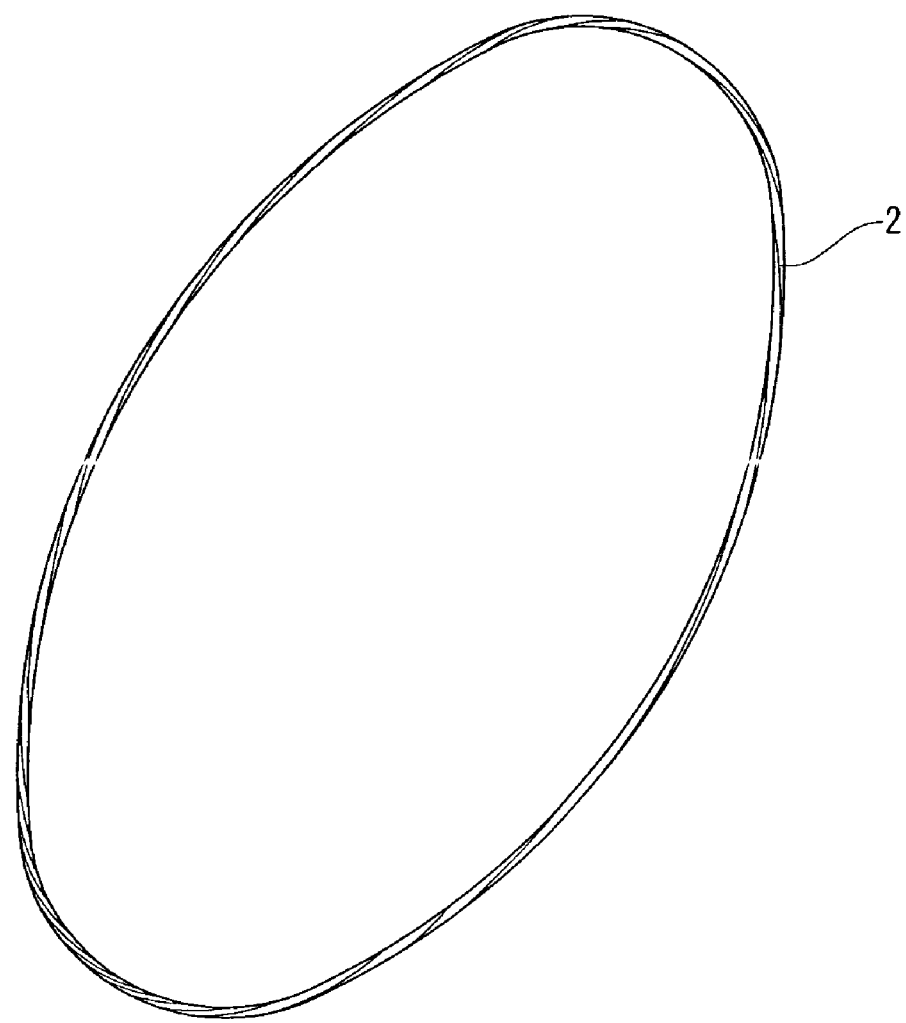
FIG. 9A shows the entire annular concentric stranded bead cord.
Figure 9B:
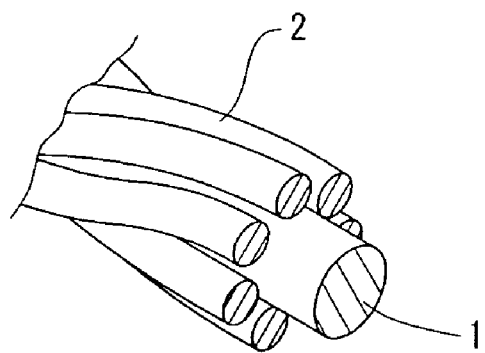
FIG. 9B is a perspective view of the annular concentric stranded bead cord.
Figure 10:
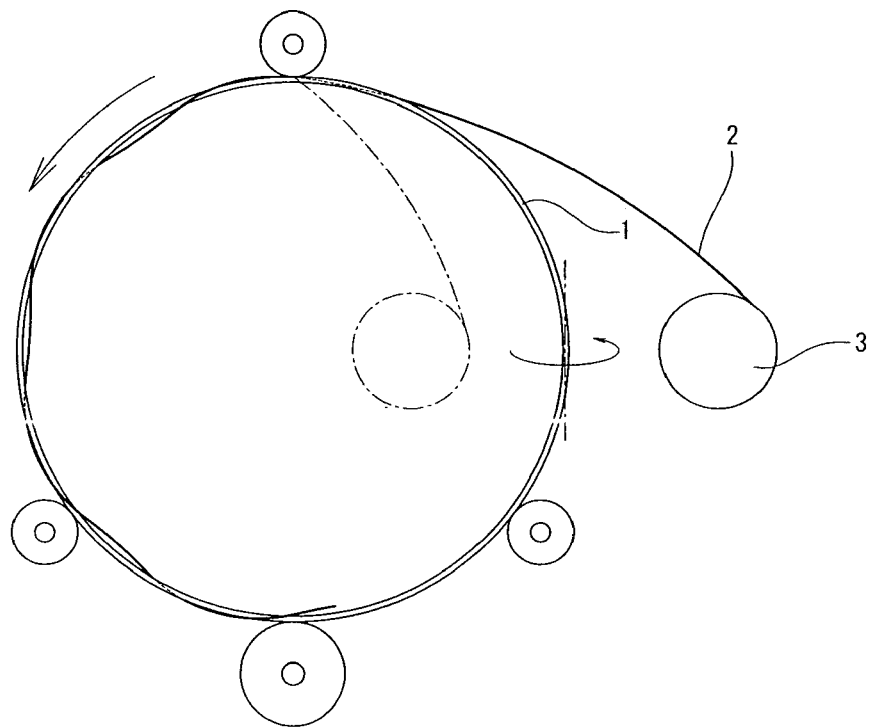
FIG. 10 is a conceptual front view of a state of movement of a reel when manufacturing a related annular concentric stranded bead cord.
Figure 11A:
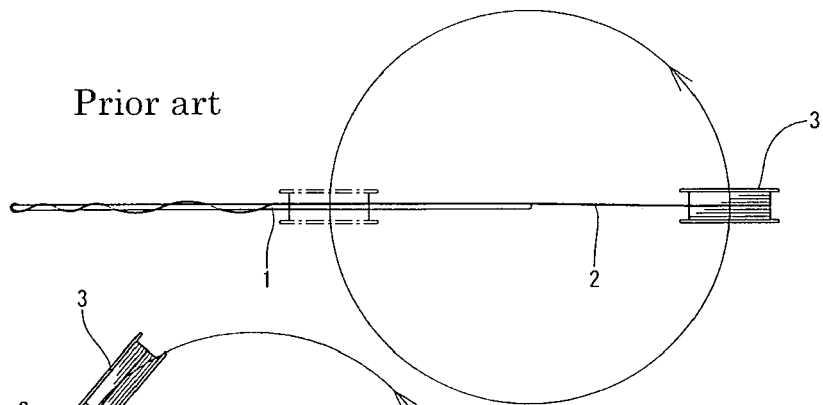
FIGS. 11A and 11B are conceptual plan views of states of movement of the reel when manufacturing the related annular concentric stranded bead cord.
Figure 11B:
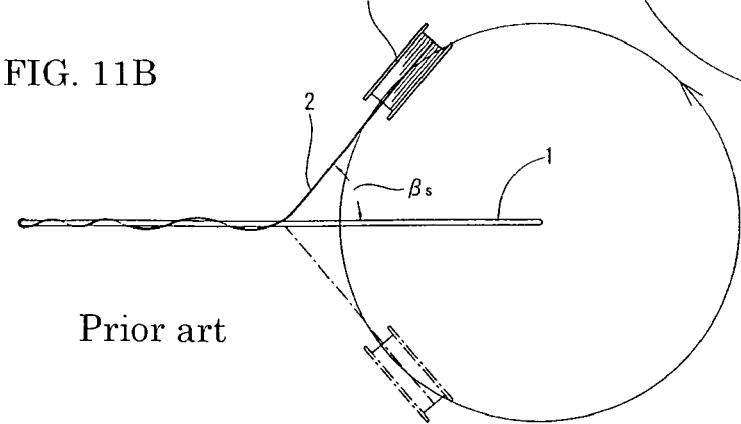
Figure 12:
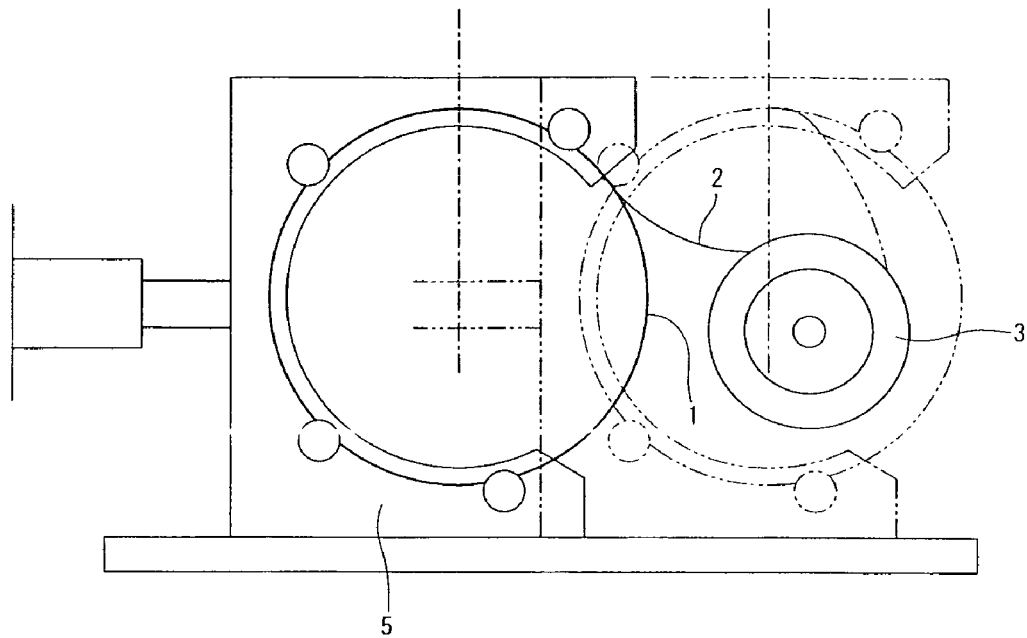
FIG. 12 is a conceptual view of a related apparatus of manufacturing an annular concentric stranded bead cord, in which an annular core is moved horizontally.
Figure 13:
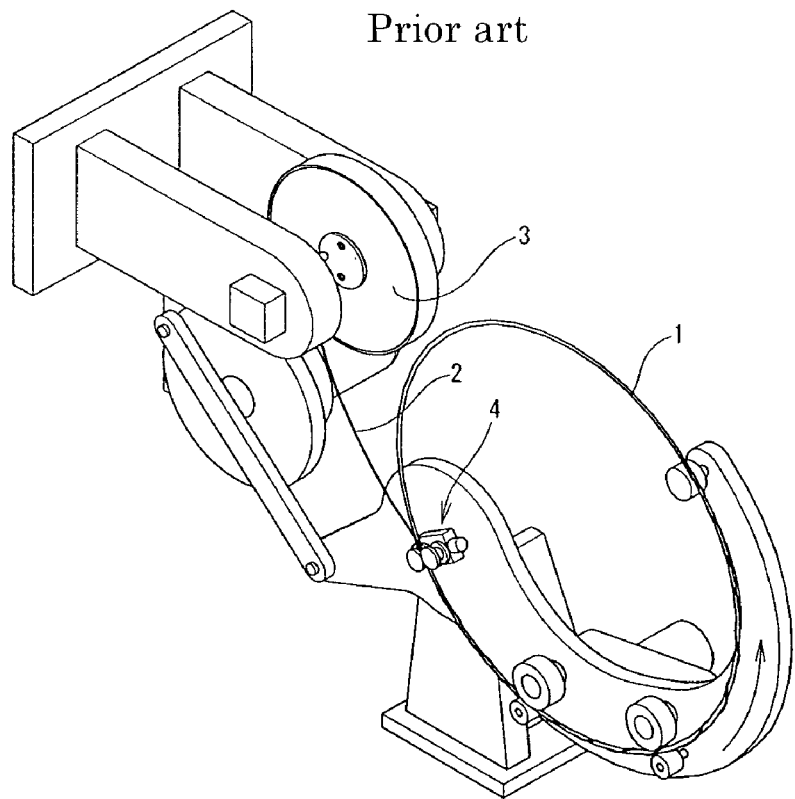
FIG. 13 is a conceptual view of a related apparatus of manufacturing an annular concentric stranded bead cord, in which an annular core undergoes pendulum swinging movement.
Figure 14:
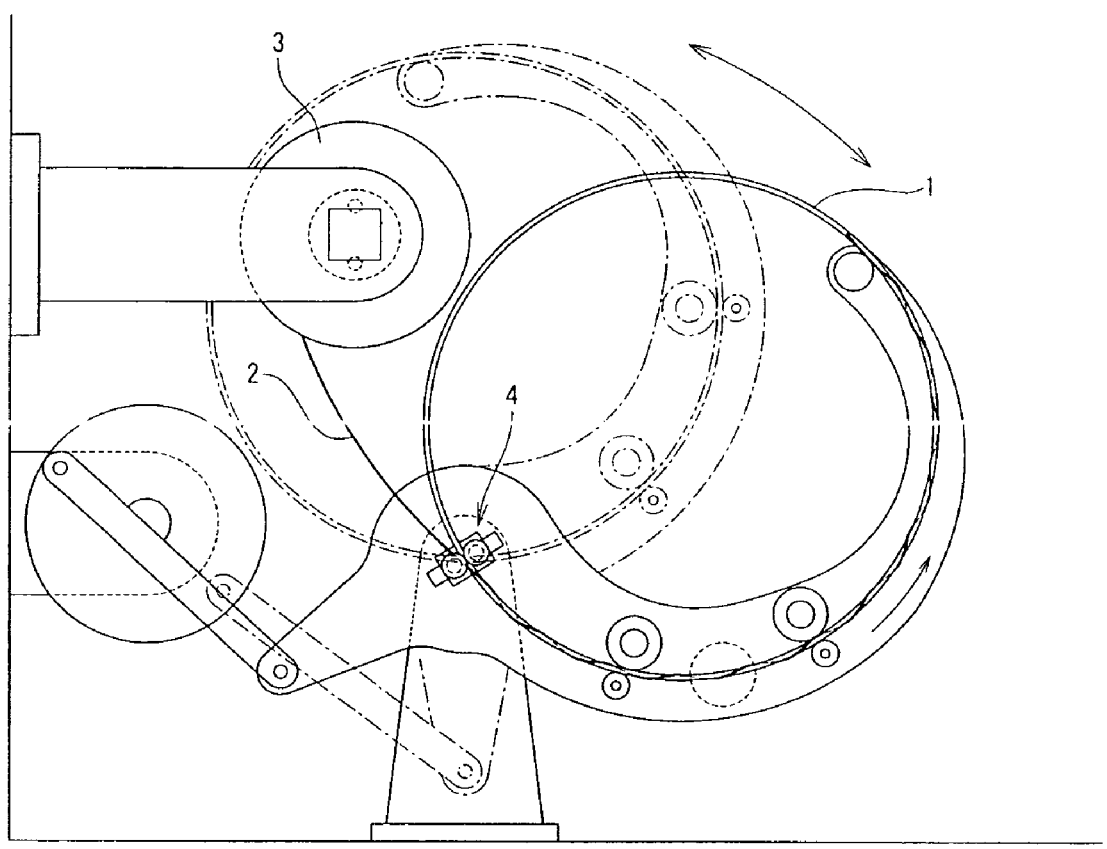
FIG. 14 is a conceptual view showing a state of pendulum swinging movement of the apparatus shown in FIG. 13.

An apparatus of manufacturing an annular concentric stranded bead cord according to an embodiment of the present invention will be described with reference to FIGS. 1 to 8.

The manufacturing apparatus includes a driving unit 10 and a supply unit 20. The driving unit 10 rotates an annular core 1 at its fixed position in a peripheral direction. The supply unit 20 supplies a lateral wire 2, wound upon a reel 21, to a winding portion of the annular core 1.

The driving unit 10 includes two pinch rollers 12a and 12b, connected to a drive motor, for rotating the annular core 1 in the peripheral direction in a vertical plane. The pinch rollers 12a and 12b are set at a support 11 on a table 14.

A clamp unit 13, which surrounds the annular core 1, is provided at the support 11 so as to be situated at a supply side of the lateral wire 2 situated in a direction opposite to the direction of rotation of the annular core 1. The clamp unit 13 includes two rollers, rollers 13a and 13b, and prevents deflection of the annular core 1 in the front/back direction to maintain stable rotation of the annular core 1 in the peripheral direction in the vertical plane. The clamp unit 13 positions a winding point of the lateral wire 2 to ensure high windability. Further, to stabilize the rotation of the annular core 1 in the vertical plane, guide rollers 15a and 15b, which guide the lower portion of the annular core 1, are set at an arm 15 extending horizontally from the support 11.

The clamp unit 13 (including the two rollers 13a and 13b) is provided with the function of fixing the winding point as a strand starting point of the lateral wire 2 as a result of maintaining stable peripheral rotation of the annular core 1 by preventing lateral deflection of the annular core 1 and surrounding the annular core 1 even if the diameter of the cord is equal to a final finish cord diameter. Therefore, a groove form is not particularly limited. Accordingly, in addition to a U-shaped groove form shown in FIG. 6A, the groove form may be an arc-shaped groove form shown in FIG. 6B, or a V-shaped groove form shown in FIG. 6C.

The supply unit 20 of the lateral wire 2 undergoes pendulum swinging movement. An arm 18, which supports the supply unit 20, undergoes pendulum swinging movement so that, as indicated by a solid line shown in FIG. 1, at one end of a period of the pendulum swinging movement, the reel 21 is positioned at the outer side of a ring of the annular core 1, and so that, as indicated by broken lines shown in FIG. 1, at the other end of the period of the pendulum swinging movement, the reel 21 is positioned at the inner side of the ring of the annular core 1.

As shown in FIG. 7, the supply unit 20 of the lateral wire 2 includes the reel 21, which takes up the lateral wire 2, and a cassette 23, having a diameter that is slightly greater than the outside diameter of the reel 1 and including at least a cylindrical outer peripheral wall that is in correspondence with an internal width of the reel. The reel 21 is rotatably accommodated in the cassette 23 so as to cover the entire lateral-wire-2 winding surface, so that it is provided with a cartridge. A draw-out hole is formed in the outer peripheral wall of the cassette 23. The lateral wire 2 is drawn out from the draw-out hole towards the clamp unit 13 at the winding point of the annular core 1.

The lateral wire 2 having a previously adjusted coil diameter is wound upon the reel 21, and is set in the cassette 23 of the of the supply unit 20. It is desirable that the coil diameter of the lateral wire 2 taken up by the reel 21 be previously adjusted so as to satisfy either one of the following expressions:

$$0.90 D_R \leq D_{SO} \leq 3.3 D_R, \text{ or}$$

$$0.55 D_C \leq D_{SO} \leq 2.0 D_C$$

where $D_R$ is the outside diameter of the reel, $D_{SO}$ is the adjusted coil diameter of the lateral wire, and $D_C$ is the center diameter of the annular core.

The supply unit 20 of the lateral wire 2 is set at one of a pair of facing front and back cassette stands 22. The cassette stands 22 are set on the top portion of the arm 18 undergoing pendulum swinging movement. The cassette stands 22 are provided vertically on respective sides of the annular core 1 at a distance not allowing the supply unit 20 of the lateral wire 2 to strike the annular core 1 when the cassette stands 22 undergo pendulum swinging movement. Guide rods 24 and transfer mechanisms are set at facing positions of ends of the pair of cassette stands 22. The guide rods 24 can removably mount the cassette 23. The transfer mechanisms transfer the cassette 23 mounted to the guide rods 24 to the other guide rod 24.

As shown in FIG. 7, the transfer mechanisms each include a rod 26, which moves in and out by an air cylinder 25, and a push-out plate 27, which pushes the central portion of the cassette 23 provided at an end of the rod 26. The rod 26 at the air cylinder 25 is extended to push the central portion of the cassette 23 by the push-out plate 27, so that the cassette 23 mounted to the guide rods 24 can be transferred to the other guide rods 24.

The arm 18 is set at the table 14 so that it undergoes pendulum swinging movement by a swinging mechanism 30 provided below the support 11 and including a rotating disc 31 and a crank shaft 32.

It is desirable that, for reliably starting the winding of the lateral wire 2, an end of the lateral wire 2 be temporarily secured to the annular core 1 with an unvulcanized rubber sheet or an adhesive tape by artificial means. Since the unvulcanized rubber sheet is of the same quality as tire rubber, it does not need to be removed later. Accordingly, after the end of the lateral wire 2 is temporarily secured to the annular core 1, the annular core 1 is rotated in the peripheral direction. For an S winding, the reel 21 of the lateral wire 2 is positioned to the right of the surface of the annular core 1. From the state in which the reel 21 is positioned at the outer side of the ring of the annular core 1 as indicated by the solid line shown in FIG. 1, the arm 18 undergoes pendulum swinging movement until the reel 21 enters the ring of the annular core 1 as indicated by the broken lines shown in FIG. 1. The air cylinder 25, provided at an end of the cassette stand 22, is used to move the reel 21 perpendicularly to the surface of the annular core 1, and the cassette 23 is transferred to the guide rods 24 of the other cassette stand 22, so that half of the winding is performed. Thereafter, from the state in which the reel 21 is positioned at the inner side of the ring of the annular core 1 as indicated by the broken lines shown in FIG. 1, the arm 18 undergoes pendulum swinging movement until the reel 21 is positioned at the outer side of the ring of the annular core 1 as indicated by the solid line shown in FIG. 1. When, at the outer side of the ring of the annular core 1, the air cylinder 25 moves the cassette 23 and the reel 21 perpendicularly to the surface of the annular core, one winding is completed.

As mentioned above, when the annular core 1 is rotated at its fixed position in the peripheral direction, and the reel 21 undergoes pendulum swinging movement with respect to the annular core 1, the following occurs as viewed from a direction of the lateral wire 2, which is supplied from the reel 21 and reaches the winding point of the annular core 1, with reference to a tangential line (in the embodiment, a horizontal line) H passing through the winding point of the annular core 1. That is, depending upon the position of a fulcrum 19 of the pendulum swinging movement of the reel 21 (that is to say, a horizontal position of the fulcrum 19 at the lower end of the arm 18), the direction of the lateral wire 2 varies vertically with reference to the horizontal line, between one end of a pendulum period (at which the reel 21 is at the position where it traverses the inner side of the ring of the annular core 1 as indicated by the broken lines shown in FIG. 1) and the other end of the pendulum period (at which the reel 21 is at the position where the reel 21 traverses the outer side of the ring of the annular core 1 as indicated by the solid line shown in FIG. 1). When angles $\alpha_1$ and $\alpha_2$ between the horizontal line H and the direction of the lateral wire 2, produced by this vertical variation, become too large, the state of arrangement of the lateral wire becomes poor.

As shown in FIG. 1, the angles $\alpha_1$ and $\alpha_2$ are angles formed between a straight line, connecting the winding point and a point at which a reel winding surface of the wire separates from the reel when the lateral wire is drawn out, and the tangential line (horizontal line) H of the circle of the annular core 1 passing through the winding point of the lateral wire.

Since the lateral wire 2 is wound upon the reel 21 in the same direction as it is wound upon the annular core 1 so that the minimum coil diameter becomes on the order of 55% of the diameter of the annular core, the influence on the arrangement state differs when the lateral wire 2 is wound from above the winding point of the annular core 1 (that is, a side opposite to the annular core with respect to the tangential line) from when the lateral wire 2 is wound from below the winding point of the annular core (that is, an annular-core side with respect to the tangential line). The influence on the arrangement state of the lateral wire 2 is greater when the lateral wire is wound from above the winding point. With reference to the tangential line (horizontal line) H of the circle of the annular core 2 passing through the winding point where the lateral wire 2 is wound with respect to the annular core 1, the angle that does not adversely affect the arrangement state of the lateral wire 2 is in a range within 15 degrees at the upper side of the horizontal line H, and is in a range within 55 degrees at the lower side of the horizontal line H. The position of the fulcrum of the pendulum swinging movement of the reel 21, that is, the horizontal position of the fulcrum 19 of the arm 18, is determined so that the lateral wire is wound at the winding point of the annular core at these angle ranges.

Next, a path of movement of the reel 21, upon which the lateral wire 2 is wound, and a path of movement of the reel 21 undergoing pendulum swinging movement are as shown in FIGS. 8A to 8B.

That is, from a state in which the reel 21 is at a position (shown in FIG. 8A) situated at the outer side of the annular core 1, the reel 21 undergoes pendulum swinging movement until the reel 21 is set in a state in which it is at a position (shown in FIG. 8B) situated in the ring of the annular core 1. The reel 21 at the position shown in FIG. 8B is transferred to an opposite surface of the annular core 1 (as shown in FIG. 8C). Then, while the reel 21 is at the opposite surface of the annular core 1, the reel 21 undergoes pendulum swinging movement until the reel 21 is set in a state in which, from the position shown in FIG. 8C, the reel 21 is positioned at the outer side of the ring of the annular core 1 (as shown in FIG. 8D). Then, from the opposite surface of the annular core 1, the reel 21 is returned to its starting point position at the original surface (that is, the position shown in FIG. 8A). The cycle of these movements is repeated. Accordingly, in the present invention, the reel 21 undergoes pendulum swinging movement from the position shown in FIG. 8A to the position shown in FIG. 8B, the position shown in FIG. 8C, the position shown in FIG. 8D, and back to the position shown in FIG. 8A. In addition, the reel 21 is moved perpendicularly to the surface of the annular core 1 from the position shown in FIG. 8B to the position shown in FIG. 8C, and from the position shown in FIG. 8D to the position shown in FIG. 8A. By this, the lateral wire 2 is spirally wound upon the annular core 1.

It is desirable that the amount of movement of the reel 21 when it perpendicularly traverses the annular core 1 be a minimum amount that allows the reel 21 to move around the annular core 1, and that the winding deviation angle $\beta_S$ with respect to the surface of the annular core 1 not exceed 29 degrees. When it exceeds 29 degrees, its difference with the twist angle becomes large, thereby adversely affecting the arrangement or disposition of the lateral wire 2.

The lateral wire 2, wound upon the reel 21, is reformed to a coil diameter in the wound state. When the direction of curvature of the lateral wire 2 that is wound is opposite to the direction of curvature of the annular core 1 at the winding point, the wound lateral wire 2 repels in the direction of the curvature of the annular core 1, thereby causing the shape of the annular core to deviate from circularity and to become distorted. Therefore, the winding tends to become disturbed. Consequently, in the embodiment, as shown in FIG. 1, the direction of curvature of the lateral wire 2 that is drawn out from the reel 21 is along the direction of formed curvature of the annular core 1 at the winding point. As a result, the lateral wire 2 is wound so that the curvature to which the lateral wire 2 is reformed is in the direction of curvature of the annular core 1, thereby making it difficult to disturb the winding of the lateral wire 2.

Although, in the above-described embodiment, the lateral wire 2 is wound upon the annular core 1 in the S direction, for example, two or three layers, etc., of the lateral wire 2 can be laminated. When two layers are wound in a Z direction, the reel 21 only needs to undergo pendulum swinging movement with the traverse direction being in the opposite direction, that is, from the position shown in FIG. 8D to the position shown in FIG. 8C, the position shown in FIG. 8B, and the position shown in FIG. 8A, and back to the position D shown in FIG. 8D. When switching to, for example, three layers and four layers, the windings are conducted in the same way as when winding one layer and two layers.

In addition, although, in the above-described embodiment, the winding point where the lateral wire 2 is wound with respect to the annular core 1 is set at the topmost portion of the annular core 1, the winding point may be set at any other position on the annular core 1. Regardless of the position of the winding point, the position of the fulcrum of the pendulum swinging movement of the reel 21 is set so that the angle between the lateral wire 2 (which is drawn out from the reel 21) and the tangential line of the circle of the annular core 1 passing through the winding point where the lateral wire 2 is wound with respect to the annular core 1 is within 15 degrees at a side opposite to the annular core with respect to the tangential line, and is in a range within 55 degrees at the side of the annular core with respect to the tangential line.

A one-layer lamination bead cord and a two-layer lamination bead cord were manufactured under various conditions using the apparatus according to the embodiment, and winding properties and formability of the products were evaluated. It was found that the factors that affect both characteristics the most are the winding deviation angle $\beta_S$ with respect to the surface of the annular core and the angle between the lateral wire and the tangential line (the horizontal line H in the embodiment shown in FIG. 1) of the circle of the annular core at the winding point. In addition, it was found that the factors that affect both characteristics the second most are the tension of the lateral wire and the previously adjusted coil diameter of the lateral wire. The results are shown in Table 1.

The winding property and the formability, which are evaluation items in Table 1, were evaluated as follows.

(1) Winding Property

Cords were placed on a flat surface of, for example, a table, and maximum gaps at locations of the cords raised from the table were measured using a scale, to perform an evaluation as follows. The number of samples n is 20.

A: The number of samples having a gap that is less than or equal to 0.5 mm is at least 11, and the gaps of all the other samples are less than or equal to 1.0 mm.

B: The number of samples having a gap that is less than or equal to 0.5 mm is less than 11, and the number of samples having a having a gap that is less than or equal to 1.0 mm is greater than or equal to 11.

C: The number of samples having a gap that is less than or equal to 1.0 mm is less than 11, and the number of samples having a gap that is less than or equal to 1.5 mm is greater than or equal to 11.

D: The number of samples having a gap that is less than or equal to 1.5 mm is less than 11.

(2) Formability

The arrangement property of lateral wires on an annular core or a one-layer winding intermediate line surface was visually inspected. The number of samples n is 20.

A: No disturbance in the arrangement of the 20 samples.

B: No disturbance in the arrangement of at least 18 samples.

C: No disturbance in the arrangement of at least 10 samples and less than 18 samples.

D: No disturbance in the arrangement of less than 10 samples.

TABLE

| Section | Cord no. | Bead cord structure | Product twist angle β (°) | Maximum winding deviation angle $\beta_s$ (°) of lateral wire | Lateral coil diameter ratio (1) ($D_{SO}/D_R$) | Lateral coil diameter ratio (2) ($D_{SO}/D_R$) | Range of angle between horizontal line and lateral wire at winding point | Cord winding property | Evaluation item Cord formability |
|---|---|---|---|---|---|---|---|---|---|
| Comparative example | 1 | 1 × 1.5 + (6) × 1.4 | 3.4 | 34 | 1.32 | 0.80 | 9° (below line)~49° (below line) | D | D |
| Comparative example | 2 | 1 × 1.5 + (6) × 1.4 | 3.4 | 28 | 3.36 | 2.03 | 9° (below line)~49° (below line) | D | C |
| Comparative example | 3 | 1 × 1.5 + (6) × 1.4 | 3.4 | 23 | 0.88 | 0.53 | 9° (below line)~49° (below line) | D | C |
| Comparative example | 4 | 1 × 1.5 + (6) × 1.4 | 3.4 | 23 | 1.09 | 0.66 | 18° (above line)~41° (below line) | C | D |
| Comparative example | 5 | 1 × 1.5 + (6) × 1.4 | 3.4 | 23 | 1.32 | 0.80 | 16° (above line)~57° (below line) | D | D |
| Embodiment | 6 | 1 × 1.5 + (6) × 1.4 | 3.4 | 23 | 1.09 | 0.66 | 13° (above line)~46° (below line) | B | C |
| Embodiment | 7 | 1 × 1.5 + (6) × 1.4 | 3.4 | 19 | 1.25 | 0.75 | 4° (above line)~43° (below line) | B | B |
| Embodiment | 8 | 1 × 1.5 + (6) × 1.4 | 3.4 | 23 | 1.32 | 0.80 | 25° (below line)~50° (below line) | B | B |
| Embodiment | 9 | 1 × 1.5 + (6) × 1.4 | 3.4 | 19 | 1.25 | 0.75 | 25° (below line)~50° (below line) | A | B |
| Embodiment | 10 | 1 × 1.5 + (6) × 1.4 | 3.4 | 19 | 1.25 | 0.75 | 21° (below line)~43° (below line) | A | A |
| Comparative example | 11 | 1 × 1.8 + (7 + 13) × 1.4 | 5.8 | 35 | 1.38 | 0.85 | 6° (below line)~47° (below line) | D | D |
| Comparative example | 12 | 1 × 1.8 + (7 + 13) × 1.4 | 5.8 | 27 | 3.33 | 2.05 | 6° (below line)~47° (below line) | D | C |
| Comparative example | 13 | 1 × 1.8 + (7 + 13) × 1.4 | 5.8 | 23 | 0.89 | 0.54 | 6° (below line)~47° (below line) | D | C |
| Comparative example | 14 | 1 × 1.8 + (7 + 13) × 1.4 | 5.8 | 23 | 1.14 | 0.70 | 18° (above line)~38° (below line) | C | D |
| Comparative example | 15 | 1 × 1.8 + (7 + 13) × 1.4 | 5.8 | 23 | 1.29 | 0.80 | 17° (above line)~56° (below line) | D | D |
| Embodiment | 16 | 1 × 1.8 + (7 + 13) × 1.4 | 5.8 | 23 | 1.14 | 0.70 | 13° (above line)~43° (below line) | B | C |

TABLE-continued

| Section | Cord no. | Bead cord structure | Product twist angle β (°) | Maximum winding deviation angle $β_s$ (°) of lateral wire | Lateral coil diameter ratio (1) ($D_{SO}/D_R$) | Lateral coil diameter ratio (2) ($D_{SO}/D_R$) | Range of angle between horizontal line and lateral wire at winding point | Cord winding property | Evaluation item Cord formability |
|---|---|---|---|---|---|---|---|---|---|
| Embodiment | 17 | 1 × 1.8 + (7 + 13) × 1.4 | 5.8 | 19 | 1.29 | 0.80 | 5° (above line)~41° (below line) | B | B |
| Embodiment | 18 | 1 × 1.8 + (7 + 13) × 1.4 | 5.8 | 23 | 1.38 | 0.85 | 22° (below line)~48° (below line) | B | B |
| Embodiment | 19 | 1 × 1.8 + (7 + 13) × 1.4 | 5.8 | 19 | 1.29 | 0.80 | 22° (below line)~49° (below line) | A | B |
| Embodiment | 20 | 1 × 1.8 + (7 + 13) × 1.4 | 5.8 | 19 | 1.29 | 0.80 | 19° (below line)~41° (below line) | A | A |

What is claimed is:

1. A method of manufacturing an annular concentric stranded bead cord, comprising:

repeating winding movements as a result of, while rotating an annular core in a peripheral direction, traversing and reciprocating a reel, upon which a lateral wire is wound, with respect to a surface of the annular core to inner and outer sides of a ring of the annular core, to traverse the reel so that a winding deviation angle $β_S$ of the lateral wire with respect to the surface of the annular core does not exceed 29 degrees, whereby the lateral wire, drawn out from the reel, is continuingly wound upon the annular core to form one or a plurality of sheath layers, wherein an in-plane movement of the reel with respect to the surface of the annular core is pendulum swinging movement by swinging an arm which supports the reel, wherein, when the lateral wire, drawn out from the reel, is continuingly spirally wound upon the annular core by repeatedly traversing the reel with respect to the surface of the annular core to the inner and outer sides of the ring of the annular core as a result of moving the reel to a position where the reel traverses the inner side of the ring of the annular core at one end of a pendulum period and to a position where the reel traverses the outer side of the ring of the annular core at the other end of the pendulum period, a position of a fulcrum of the pendulum swinging movement of the reel is set so that an angle between the lateral wire, drawn out from the reel, and a tangential line of a circle of the annular core passing through a winding point where the lateral wire is wound with respect to the annular core is in a range within 15 degrees at a side opposite to the annular core with respect to the tangential line, and is in a range within 55 degrees at the side of the annular core with respect to the tangential line, wherein a coil diameter of the lateral wire, taken up by the reel, is previously reformed so as to satisfy either one of the following expressions:

$$0.90D_R \leq D_{SO} \leq 3.3D_R, \text{ or}$$

$$0.55D_C \leq D_{SO} \leq 2.0D_C,$$

where $D_R$ is an outside diameter of the reel, $D_{SO}$ is the reformed coil diameter of the lateral wire, and $D_C$ is a center diameter of the annular core.

2. The method of manufacturing an annular concentric stranded bead cord according to claim 1, wherein the lateral wire, drawn out from the reel, is continuingly spirally wound upon the annular core as a result of temporarily securing a winding start end of the lateral wire using an unvulcanized or semi-vulcanized rubber sheet.

3. The method of manufacturing an annular concentric stranded bead cord according to claim 1, wherein a direction of curvature of the lateral wire, drawn out from the reel, is along a direction of curvature of the annular core at the winding point.

4. An apparatus of manufacturing an annular concentric stranded bead cord, comprising:

a driving unit that rotates an annular core in a peripheral direction;

a reel that supplies a lateral wire to a winding portion of the annular core;

a pendulum mechanism that causes the reel to undergo an in plane pendulum swinging movement with respect to the annular core along a surface of the annular core by swinging an arm which supports the reel so that the reel is moved to a position where the reel traverses an inner side of a ring of the annular core at one end of a pendulum period of the reel and to a position where the reel traverses an outer side of the ring of the annular core at the other end of the pendulum period; and facing reel transfer mechanisms provided on respective sides of the surface of the annular core so as to be positioned at a distance from the annular core not preventing the rotation of the annular core in the peripheral direction, wherein the lateral wire, drawn out from the reel, is continuingly spirally wound upon the annular core by repeatedly traversing the reel with respect to the surface of the annular core to the inner and outer sides of the ring of the annular core, and a position of a fulcrum of the pendulum swinging movement of the reel is set so that an angle between the lateral wire, drawn out from the reel, and a tangential line of a circle of the annular core passing through a winding point where the lateral wire is wound with respect to the annular core is in a range within 15 degrees at a side opposite to the annular core with respect to the tangential line, and is in a range within 55 degrees at the side of the annular core with respect to the tangential line, and wherein a coil diameter of the lateral wire, taken up by the reel, is previously reformed so as to satisfy either one of the following expressions:

$$0.90D_R \leq D_{SO} \leq 3.3D_R, \text{ or}$$

$$0.55D_C \leq D_{SO} \leq 2.0D_C,$$

where $D_R$ is an outside diameter of the reel, $D_{SO}$ is the reformed coil diameter of the lateral wire, and $D_C$ is a center diameter of the annular core.

5. The apparatus of manufacturing an annular concentric stranded bead cord according to claim 4, wherein the driving unit includes two pinch rollers that rotate the annular core, and wherein the apparatus further comprises a clamp unit that is provided at a lateral-wire supply side of the two pinch rollers, that loosely guides the annular core, and that serves as the winding point when winding the lateral wire upon the annular core.

6. The apparatus of manufacturing an annular concentric stranded bead cord according to claim 4, wherein the two facing reel transfer mechanisms are provided at a minimum distance allowing the reel to move within the ring of the annular core and across a plane of the ring of the annular core.

7. The apparatus of manufacturing an annular concentric stranded bead cord according to claim 4, wherein the reel, upon which the lateral wire is wound, is rotatably accommodated in a cassette including a cylindrical outer peripheral wall being in correspondence with an internal width of the reel and having a diameter that is slightly greater than an outside diameter of the reel, the outer peripheral wall of the cassette has a draw-out hole, and the lateral wire is drawn out from the draw-out hole.

* * * * *